United States Patent
Benhase et al.

(10) Patent No.: US 8,117,385 B2
(45) Date of Patent: Feb. 14, 2012

(54) SYSTEM AND METHOD OF MAXIMIZATION OF STORAGE CAPACITY IN A CONFIGURATION LIMITED SYSTEM

(75) Inventors: Linda V. Benhase, Tucson, AZ (US);
John C. Elliott, Tucson, AZ (US);
Robert A. Kubo, Tucson, AZ (US);
Gregg S. Lucas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 12/018,330

(22) Filed: Jan. 23, 2008

(65) Prior Publication Data

US 2009/0187707 A1    Jul. 23, 2009

(51) Int. Cl.
*G06F 12/00* (2006.01)

(52) U.S. Cl. ........ 711/114; 711/170; 714/6.22; 719/325

(58) Field of Classification Search .................. 711/114, 711/170; 714/6.22; 719/325
See application file for complete search history.

(56) References Cited

U.S. PATENT DOCUMENTS

| | | | |
|---|---|---|---|
| 5,612,790 A | 3/1997 | Sakamoto et al. | |
| 5,963,945 A * | 10/1999 | Pal | ........................ 1/1 |
| 6,237,109 B1 | 5/2001 | Achiwa et al. | |
| 6,725,394 B1 | 4/2004 | Bolt | |
| 6,915,420 B2 | 7/2005 | Hensley | |
| 2006/0164743 A1 | 7/2006 | Liu | |
| 2006/0206671 A1 | 9/2006 | Aiello et al. | |
| 2006/0236092 A1* | 10/2006 | Hamalainen | .................. 713/151 |
| 2008/0126849 A1* | 5/2008 | Kotzur et al. | ..................... 714/7 |

* cited by examiner

*Primary Examiner* — Jae Yu
(74) *Attorney, Agent, or Firm* — Hamilton & Terrile, LLP; Gary W. Hamilton

(57) ABSTRACT

A method, system and computer-usable medium are disclosed for providing management of serial attached small computer system interface (SAS) storage devices. A host computer comprises a storage controller connected to a SAS port expander comprising a plurality of ports that are logically assigned to target storage devices. The device ports of all storage devices physically attached to the SAS port expander are bypassed to remove their logical SAS expander port assignments. The storage controller unbypasses the device ports, allowing it to recognize the presence of all physically attached storage devices. The recognized storage devices are inventoried and storage devices that are not logically assigned a SAS expander port are designated as being spare storage devices. SAS expander ports are logically assigned to the non-spare storage devices and SAS storage operations are performed.

10 Claims, 5 Drawing Sheets

SYSTEM AND METHOD OF MAXIMIZATION OF STORAGE CAPACITY IN A CONFIGURATION LIMITED SYSTEM

BACKGROUND OF THE INVENTION

1. Field of the Invention

Embodiments of the disclosure relate in general to the field of computers and similar technologies, and in particular to software utilized in this field. Still more particularly, it relates to the management of serial attached small computer system interface (SAS) storage devices.

2. Description of the Related Art

Information processing systems continue to gain widespread adoption by many segments of today's modern society. At the same time, managing and protecting information is becoming more complex. This complexity is due in part to the need to store and access an ever increasing amount of information. As a result, the storage capacity of these systems must be continually updated, driving demand for larger, faster, and more reliable data storage systems. These updates are often costly and disruptive to users.

A variety of mass storage devices exist today, including hard disks, which continue to increase in performance and capacity, while simultaneously decreasing in size, power consumption, and cost. It has become common to use such disk drives in Redundant Array of Independent Disk (RAID) subsystems, which leverage commodity components to deliver cost-effective data storage redundancy and sustainability. However, the design attributes of the components typically used in these systems often limit their configuration and operating characteristics. One such limitation is when there is a mismatch between the physical configuration of a disk storage subsystem and the number of serial attached small computer system interface (SAS) target and initiator devices that a SAS expander or bridge device can support in a mixed mode configuration.

For example, a disk subsystem may comprise one or more disk storage enclosures, each of which can mechanically support sixteen storage devices. Each of the storage devices consumes a target device slot of the total number supported by the SAS expander or bridge device. Likewise, each enclosure management services device, such as a SCSI Enclosure Services (SES) device, also consumes a target device slot supported by the SAS expander or bridge device. Assuming that one SES device is used to manage sixteen (16) target devices, then an odd number of target device slots are consumed. Accordingly, if the number of target devices a SAS expander or bridge device can support is an even increment of sixteen (e.g., 64), then there is a resulting mismatch between the number of logically supported devices and the system's mechanical packaging configuration. In this example, if the SAS expander or bridge supports a total of 64 target devices, then there is a mismatch with the system mechanical configuration of 68 target devices (64 disk drive targets and 4 SES device targets). It will he appreciated that failure to align mechanical configurations with the logically supported configuration of the system creates the potential for human error, which in turn can lead to invalid or unsupported system configurations.

BRIEF SUMMARY OF THE INVENTION

The present invention includes, but is not limited to, a method, system and computer-usable medium for providing management of serial attached small computer system interface (SAS) storage devices. In various embodiments, a host computer comprises a storage controller connected to a SAS port expander, which in turn is attached to a storage enclosure. In one embodiment, the storage controller is a redundant array of independent disks (RAID) controller. The SAS port expander comprises a plurality of initiator, expander, and expander target ports that can be logically assigned for connection to other SAS devices. In one embodiment, the logical assignment of SAS expander target ports is stored in a SAS expander poll assignment configuration.

In one embodiment, a power-on sequence is initiated on a SAS storage enclosure. A default configuration is applied that bypasses the device ports of all physically attached storage devices. The bypassing of the device ports removes any current logical assignment of SAS expander target ports. The storage controller then unbypasses the device ports, which allows it to recognize the presence of all physically attached storage devices. A SAS storage manager then provides commands to the storage controller to perform operations to discover all physically attached SAS storage devices. As they are discovered, the SAS storage devices are inventoried along with their physical description and operational parameters. Comparison operations are then performed between the inventoried information and the SAS expander port assignment configuration.

Inventoried SAS storage devices that do not have a logical assignment of a SAS expander are designated as being spare SAS storage devices. The SAS storage device inventory is then updated, indicating the location within the storage enclosure of the spare SAS storage devices. Once the storage enclosure inventory is updated, the device ports of all of the physically attached SAS storage devices are re-bypassed. The SAS expander port assignment configuration is then applied, with the result that SAS expander target ports are logically assigned to the device ports of the non-spare SAS storage devices. SAS storage operations are performed, including the monitoring for the occurrence of fault conditions. If a fault is detected, the SAS storage manager retrieves the SAS device inventory information for the affected storage enclosure. The SAS device inventory information is processed to determine if a spare SAS storage device is available within the storage enclosure. If so, the logical assignment of a SAS expander target port is removed from the device port of the failed SAS storage device. The SAS expander target port is then logically assigned to the device port of the spare SAS storage device. The expander port logical assignment is then validated and the SAS expander port assignment configuration is updated. Then the SAS device inventory information for the storage enclosure is updated, indicating that the spare drive is no longer available. The previously spare drive is then placed into an operational state to perform SAS storage operations. The above, as well as additional purposes, features, and advantages of the present invention will become apparent in the following detailed written description.

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

Figure 1:
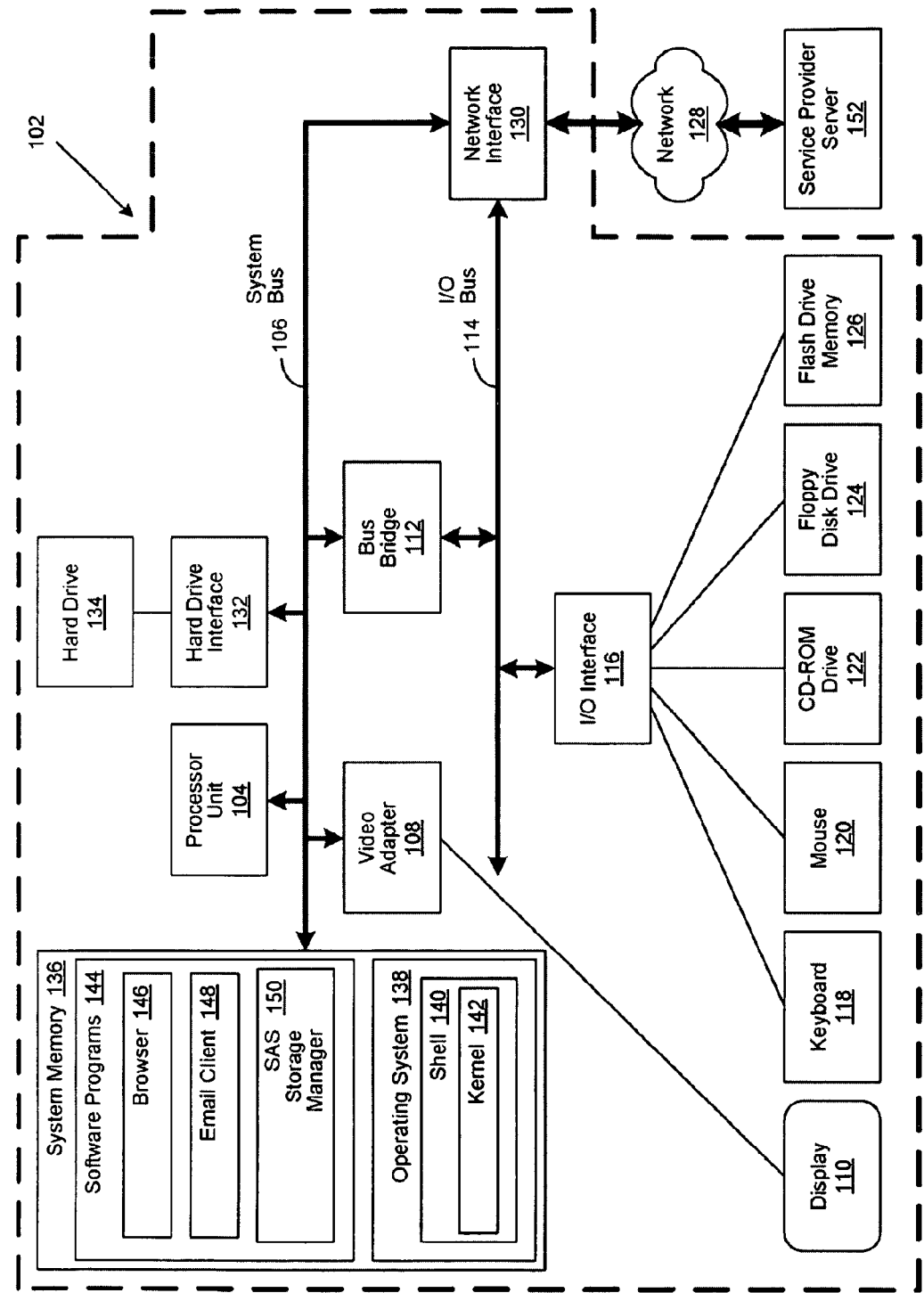
FIG. 1 depicts an exemplary client computer in which the present invention may be implemented.

A method, system and computer-usable medium are disclosed for providing management of serial attached small computer system interface (SAS) storage devices. As will be appreciated by one skilled in the art, the present invention may be embodied as a method, system, or computer program product. Accordingly, embodiments of the invention may be implemented entirely in hardware, entirely in software (including firmware, resident software, micro-code, etc.), or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device or a magnetic storage device. In the context of this document, a computer-usable or computer-readable medium may be any medium that can contain, or store the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various 110 devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a textbased, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management.

Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. Software programs 144 also include a serial attached small computer system interface (SAS) storage manager 150. The SAS storage manager 150 includes code for implementing the processes described in FIGS. 2 through 4 described hereinbelow. In one embodiment, client computer 102 is able to download the SAS storage manager 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
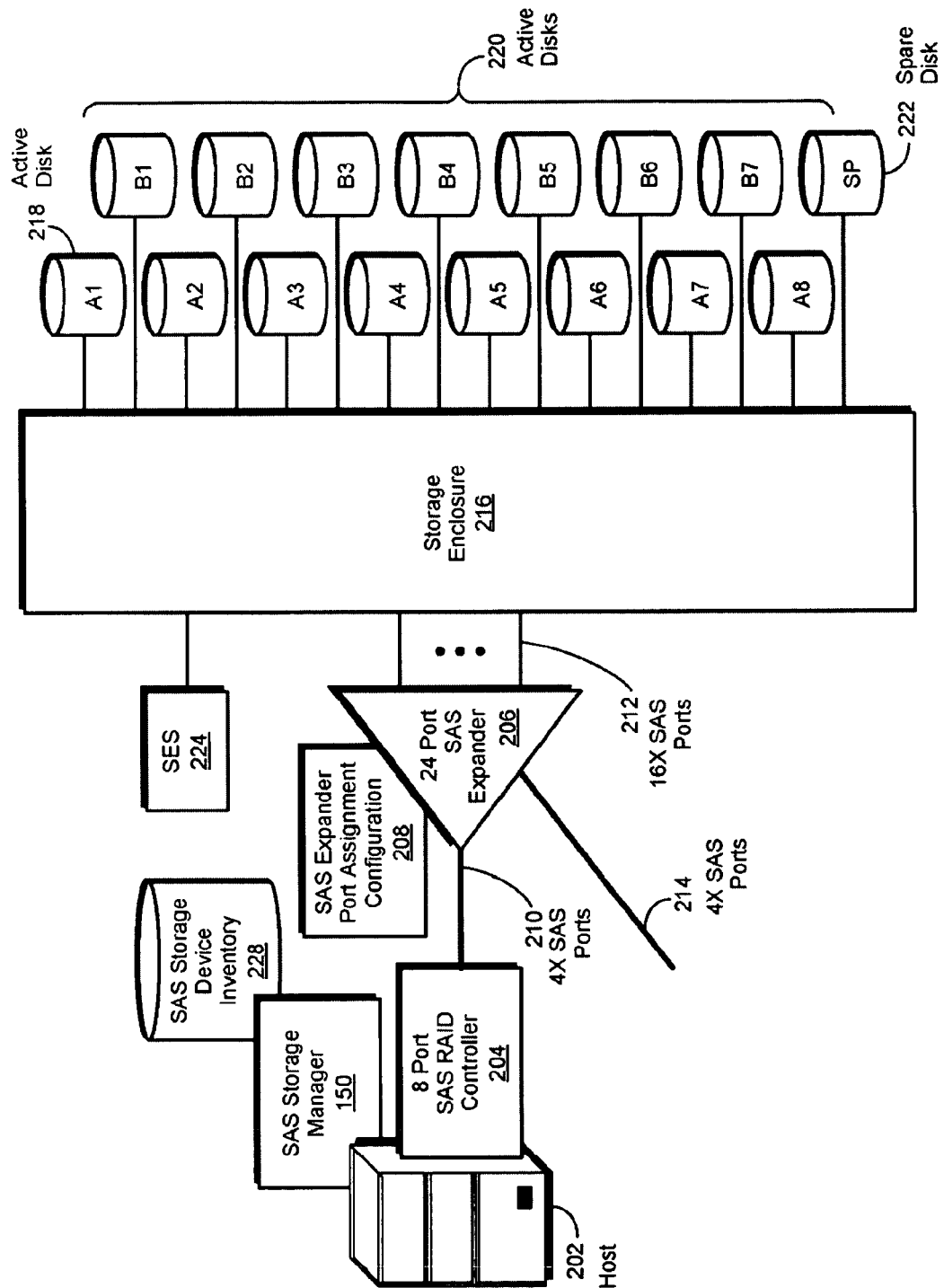
FIG. 2 is a generalized block diagram illustrating a serial attached small computer system interface (SAS) storage manager as implemented in an embodiment of the invention.

FIG. 2 is a generalized block diagram illustrating a serial attached small computer system interface (SAS) storage manager as implemented in an embodiment of the invention. In various embodiments, a host computer 202 comprises a RAID controller 204 connected to a SAS port expander 206, which in turn is attached to a storage enclosure 216. The SAS port expander 206 comprises SAS initiator ports 210, SAS expander ports 214, and a plurality of SAS expander target ports 212 that can be logically assigned for connection to the device ports of other SAS devices 218, 220, 222, 224. For example, a SAS edge expander supports communications for up to 128 SAS addresses, while a SAS fan-out expander can connect tip to 128 edge expanders or SAS end devices. As a result, there can be up to 16,256 SAS devices in a SAS domain. Each SAS initiator port 210, SAS expander target port 212, and SAS expander port 214 has a unique SAS port identifier within a SAS domain. The SAS expander 206 may be a separate unit, or it may be integrated into the storage enclosure 216. Such storage enclosures generally comprise a backplane connecting a plurality of physically attached storage devices 218, 220, 222, each of which has one or more device ports. In one embodiment, the logical assignment of SAS expander target ports 212 to the device ports of SAS target devices such as disk drives 218, 220, 222, and SCSI enclosure services (SES) processor 224 are stored in a SAS expander port assignment configuration 208.

The storage enclosure 216 also includes a SES processor 224 to manage fans, temperature sensors, etc. The SES processor 224 can be a standalone logical unit, which has its own SAS address and logical unit number. When implemented with the SAS port expander 206 and the storage enclosure 216, the SES processor 224 is logically assigned a SAS expander target port 212. The logical assignment of SAS expander target port 212 to the SES processor 224 reduces by one the number of available SAS expander target ports 212 that can be logically assigned to the device ports of physically attached storage devices 218, 220, 222. As illustrated in FIG. 2, the SAS port expander 206 comprises 24 total SAS expander ports. Four of these are SAS initiator ports 210, four are SAS expander ports 214 for connection to other SAS devices, such as another SAS port expander, and sixteen are SAS expander target ports 212. Since the SES processor 224 is logically assigned one of the SAS expander target ports 212, only fifteen SAS expander target ports 212 remain for assignment to active storage devices 218, 220. As a result, storage device 222 is not assigned one of the SAS expander target ports 212, even though it is physically resident in storage enclosure 216 and physically attached to the SAS port expander 206.

In one embodiment, a power-on sequence is initiated on the SAS storage enclosure 216. A default configuration is then applied that bypasses the device ports of all physically attached storage devices 218, 220, 222 contained within the SAS storage enclosure 216. The bypassing of the device ports removes any current logical assignment of SAS expander target ports 212, such as from the SAS expander port assignment configuration 208. The RAID controller 204 then unbypasses the device ports, which allows it to recognize the presence of all storage devices 218, 220, 222 physically attached to the SAS storage enclosure 216. Those of skill in the art will appreciate that the SAS port expander 206 will only recognize those physically attached storage devices 218, 220 that are logically assigned SAS expander target ports 212. The additional SAS storage device 222 may be present within the storage enclosure 216 and physically attached to the SAS port expander 206. But if all available SAS expander target ports 212 have been logically assigned to other storage devices 218, 220, or the SES processor 224, then the remaining storage device 222 will not be recognized by the SAS port expander 206.

In one embodiment, the SAS storage manager 150 provides commands to the RAID controller 204 to perform discovery operations to discover all physically attached SAS storage devices 218, 220, 222 within the storage enclosure 216. As the storage devices 218, 220, 222 are discovered, they are inventoried by the SAS storage manager 150 along with their physical description and operational parameters. The inventoried SAS storage device information is then stored in the SAS storage device inventory 228. Comparison operations are then performed between the inventoried information stored in the storage enclosure inventory 228 and the SAS expander port assignment configuration 208. A determination is then made that the SAS storage device 222 is present in the storage enclosure 216, but it does not have a logical assignment of a SAS expander target port 212. As a result, the SAS storage manager 150 designates the identified SAS storage device 222 as being a spare SAS storage device available for the assignment of SAS expander target ports 212. The SAS storage device inventory 228 for the storage enclosure 216 is then updated, indicating the location within the storage enclosure 216 of the spare SAS storage device 222. Once the storage enclosure inventory 228 is updated, the device ports of all of the physically attached storage devices 218, 220, 222 are re-bypassed.

The SAS expander port assignment configuration 208 is then applied to the inventoried storage enclosure 216, with the result that SAS expander target ports 212 are logically assigned to the device ports of the SAS storage devices 218, 220 within the storage enclosure 216. Once the SAS expander port assignment configuration 208 is applied, SAS storage operations are performed, including the monitoring of SAS storage devices 218, 220 for the occurrence of fault conditions. For example, a fault is detected in SAS storage device 218. As a result, the SAS storage manager 150 retrieves the SAS device inventory information for storage enclosure 216 from the SAS device inventory 228. Once retrieved, the SAS device inventory information is processed and it is determined that the spare SAS storage device 222 is available within the storage enclosure 216 for the logical assignment of SAS expander target ports 212. The logical assignment of a SAS expander target port 212 is removed from the device port of the failed SAS storage device 218. The SAS expander target port 212 is then logically assigned to the device port of the spare SAS storage device 222. The expander port logical assignment is then validated and the SAS expander port assignment configuration 208 is updated. Then the SAS device inventory information for the storage enclosure 216 is updated, indicating that the spare drive 222 is no longer available for the logical assignment of a SAS expander target port 212. The previously spare drive 222 is then placed into an operational state to perform SAS storage operations.

Figure 3C:
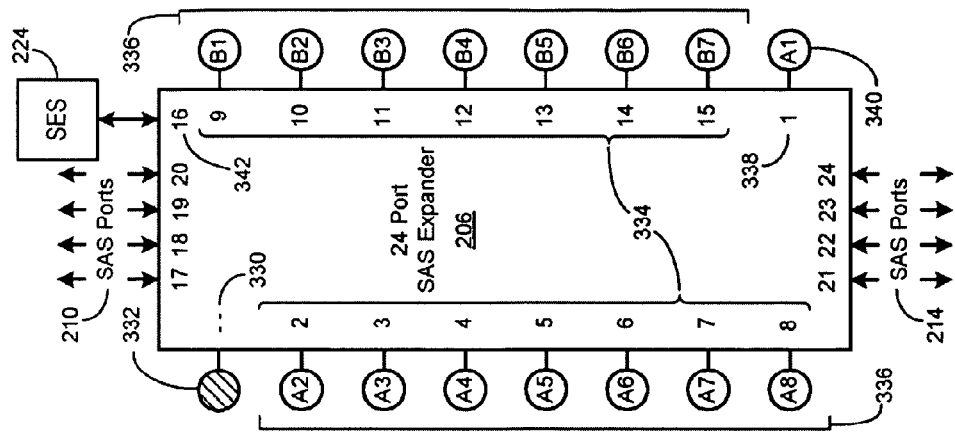
FIGS. 3a-c are simplified block diagrams illustrating the implementation of a SAS storage manager with a SAS expander to manage SAS storage devices in accordance with an embodiment of the invention.
Figure 3B:
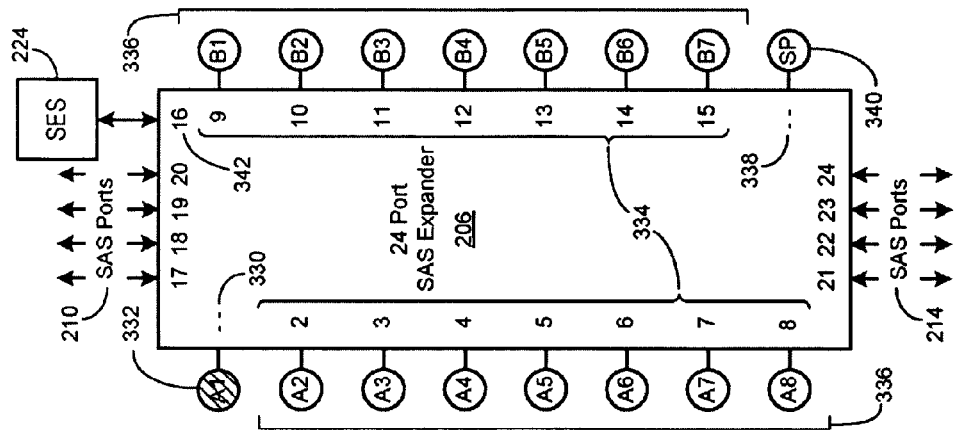
Figure 3A:
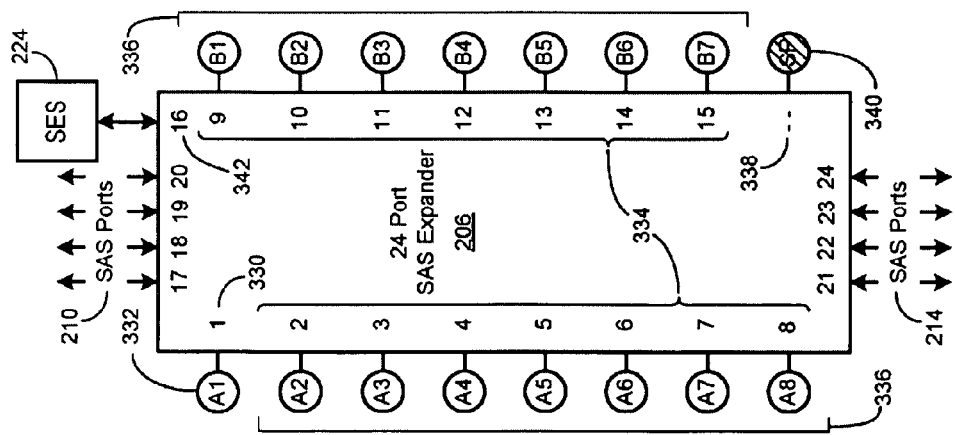

FIGS. 3a-c are simplified block diagrams illustrating the implementation of a serial attached small computer system interface (SAS) storage manager with a SAS expander to manage SAS storage devices in accordance with an embodiment of the invention. In various embodiments, a host computer comprises a RAID controller connected to a SAS port expander 206, which in turn is attached to a storage enclosure. The SAS port expander 206 comprises SAS initiator ports 210, SAS expander ports 214, and a plurality of SAS expander target ports 330, 334, 338, 342 that can be logically assigned for connection to the device ports of other SAS devices 332, 336, 340, 224. In one embodiment, the logical assignment of SAS expander target ports 330, 334, 338 to the device ports of SAS target devices such as disk drives 332, 336, 340, and SCSI enclosure services (SES) processor 224 is contained in a SAS expander port assignment configuration.

The SES processor 224 is used to manage fans, temperature sensors, etc. within the storage enclosure. The SES processor 224 can be a standalone logical unit, which has its own SAS address and logical unit number. When implemented with the SAS port expander 206 and a storage enclosure the SES processor 224 is logically assigned a SAS expander target port 342. The logical assignment of SAS expander target port 342 to the SES processor 224 reduces by one the number of available SAS expander target ports 330, 334 that can be logically assigned to the device ports of physically attached storage devices 332, 336, 340. As illustrated in FIG. 3a, the SAS port expander 206 comprises 24 total SAS expander ports. Four of these are SAS initiator ports 210, four are SAS expander ports 214 for connection to other SAS devices, such as another SAS port expander, and sixteen are SAS expander target ports 330, 334, 342. Since the SES processor 224 is logically assigned one of the SAS expander target ports 342, only fifteen SAS expander target ports 330, 334 remain for assignment to active storage devices 332, 336. As a result, storage device 340 is not assigned one of the SAS expander target ports 338, even though it is physically resident in storage enclosure and physically attached to the SAS port expander 206.

In one embodiment, a power-on sequence is initiated on the SAS storage enclosure that physically contains SAS storage devices 332, 336, 340. A default configuration is then applied that bypasses the device ports of all physically attached storage devices 332, 336, 340. The bypassing of the device ports removes any current logical assignment of SAS expander target ports 330, 334 such as from a SAS expander port assignment configuration. The RAID controller then unbypasses the device ports, which allows it to recognize the presence of all storage devices 332, 336, 340 physically attached to the SAS storage enclosure. Skilled practitioners of the art will appreciate that the SAS port expander 206 will only recognize those physically attached storage devices 332, 336 that are logically assigned their respective SAS expander target ports 330, 334. The additional SAS storage device 340 may be present within the storage enclosure and physically attached to the SAS port expander 206. But if all available SAS expander target ports 330, 334, 342 have been logically assigned to other storage devices 332, 336, or the SES processor 224, then the remaining storage device 340 will not be recognized by the SAS port expander 206.

In one embodiment, a SAS storage manager provides commands to the RAID controller to perform discovery operations to discover all physically attached SAS storage devices 332, 336, 340 within the storage enclosure. As the storage devices 332, 336, 340 are discovered, they are inventoried by the SAS storage manager along with their physical description and operational parameters. The inventoried SAS storage device information is then stored in the SAS storage device inventory. Comparison operations are then performed between the inventoried information stored in the storage enclosure inventory and the SAS expander port assignment configuration. A determination is then made that the SAS storage device 340 is present in the storage enclosure, but it does not have a logical assignment of a SAS expander target port 338. As a result, the SAS storage manager designates the identified SAS storage device 340 as being a spare SAS storage device available for the assignment of SAS expander target ports 338. The SAS storage device inventory for the storage enclosure is then updated, indicating the location within the storage enclosure of the spare SAS storage device 340. Once the storage enclosure inventory is updated, the device ports of all of the physically attached storage devices 332, 336, 340 are re-bypassed.

The SAS expander port assignment configuration is then applied to the inventoried storage enclosure, with the result that SAS expander target ports 330, 334, 342 are logically assigned to the device ports of the SAS storage devices 332, 336 and the SES processor 224. Once the SAS expander port assignment configuration is applied, SAS storage operations are performed, including the monitoring of SAS storage devices 332, 336 for the occurrence of fault conditions. For example, as illustrated in FIG. 3b, a fault is detected in SAS storage device 332. As a result, the SAS storage manager retrieves the SAS device inventory information for the storage enclosure from the SAS device inventory. Once retrieved, the SAS device inventory information is processed and it is determined that the spare SAS storage device 340 is available within the storage enclosure for the logical assignment of SAS expander target ports 338. The logical assignment of SAS expander target port 330 is removed from the device port of the failed SAS storage device 332. As illustrated in FIG. 3c, the SAS expander target port 338 is then logically assigned to the device port of the spare SAS storage device 340. The expander port logical assignment is then validated and the SAS expander port assignment configuration is updated. Then the SAS device inventory information for the storage enclosure is updated, indicating that the spare drive 340 is no longer available as a spare. The previously spare drive 340 is then placed into an operational state to perform SAS storage operations.

Figure 4A:
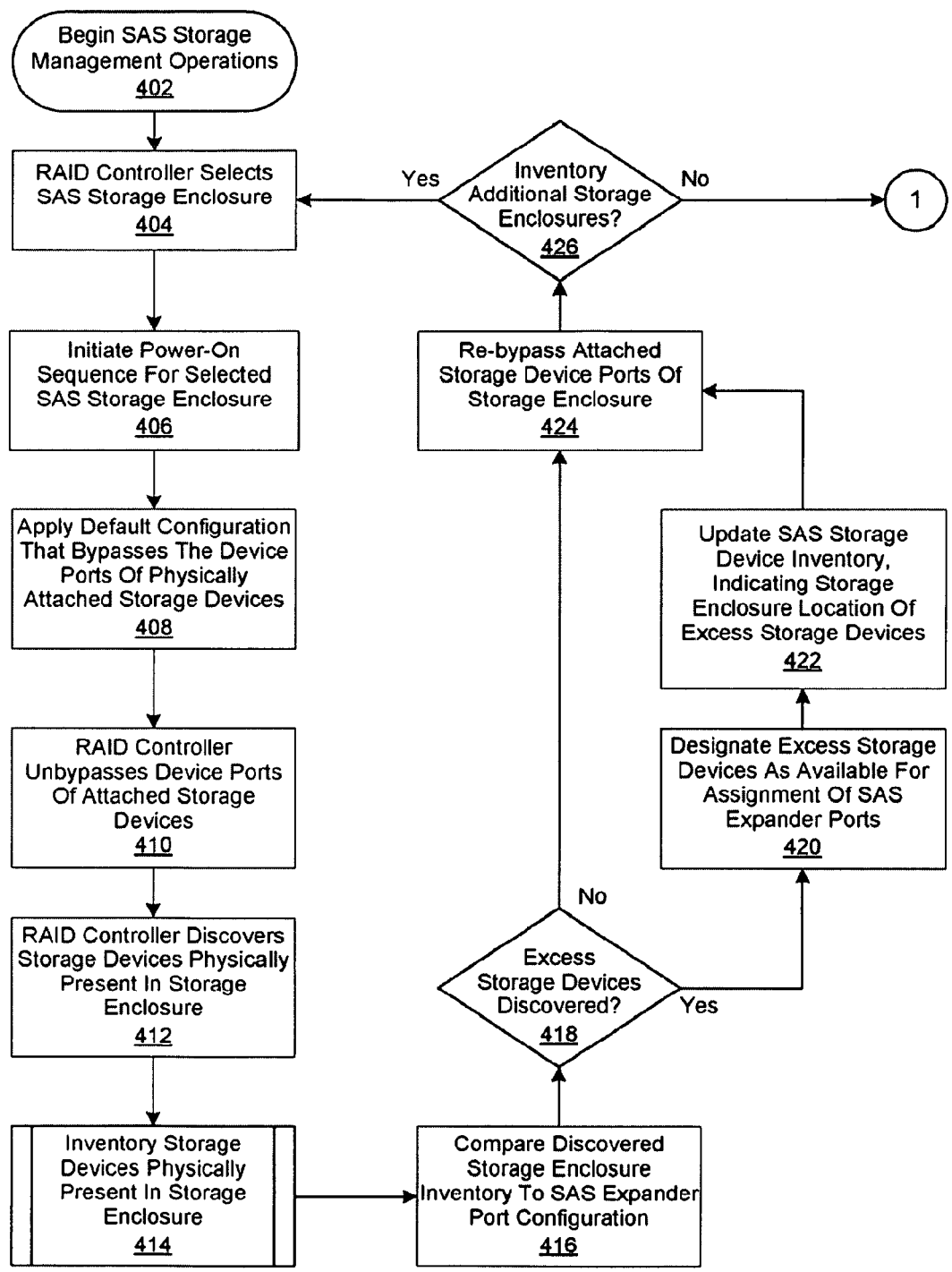
FIGS. 4a-b are generalized flowcharts illustrating the implementation of a SAS storage manager with a SAS expander to manage SAS storage devices in accordance with an embodiment of the invention.
Figure 4B:
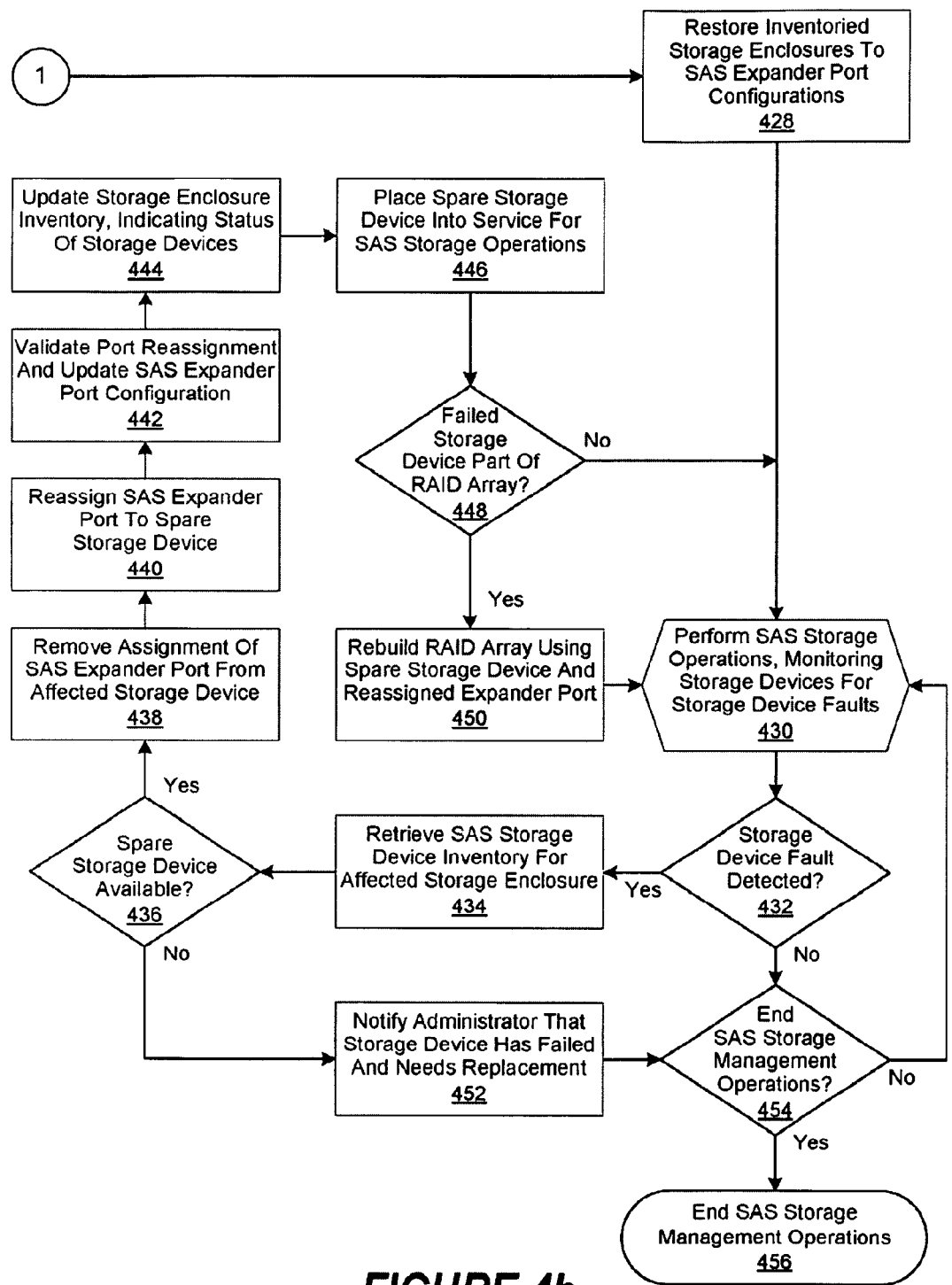

FIGS. 4a-b are generalized flowcharts illustrating the implementation of a serial attached small computer system interface (SAS) storage manager with a SAS expander to manage SAS storage devices in accordance with an embodiment of the invention. In various embodiments, a host computer comprises a storage controller connected to a SAS port expander, which in turn is attached to a storage enclosure. The storage controller is a SAS initiator device that issues SAS device service and task management requests to be processed by a SAS target device. In one embodiment, the storage controller is a redundant array of independent disks (RAID) controller, which is used to define, initiate and manage RAID storage arrays familiar to those of skill in the art.

A SAS expander expands the number of SAS end devices that can be connected together. There are two types of SAS expanders edge expander and fan-out expanders, each of which comprises a plurality of SAS ports that can be logically assigned for connection to the ports of other SAS devices. For example, an edge expander supports communications for up to 128 SAS addresses, while a fan-out expander can connect up to 128 edge expanders or SAS end devices. As a result, there can be up to 16,256 SAS devices in a SAS domain. Each SAS initiator port, SAS expander target port, and SAS expander port has a unique SAS port identifier within a SAS domain. The SAS expander may be a separate unit, or it may be integrated into a storage enclosure. Such storage enclosures generally comprise a backplane connecting a plurality of physically attached storage devices, each of which has one or more device ports. In one embodiment, the logical assignment of SAS expander ports to the device ports of SAS target devices such as disk or tape drives is contained in a SAS expander port assignment configuration.

In the embodiment illustrated in FIGS. 4a-b, SAS storage management operations are begun in step 402, followed by the selection of a target SAS storage enclosure in step 404 by a RAID controller. A power-on sequence is initiated on the selected SAS storage enclosure in step 406, followed in step 408 with the application of a default configuration that bypasses the device ports of all physically attached storage devices contained within the SAS storage enclosure. The bypassing of the device ports removes any current logical assignment of SAS expander ports, such as from a SAS expander port assignment configuration. The RAID controller then unbypasses the device ports in step 410, which allows it to recognize the presence of any storage device physically attached to the SAS storage enclosure. Those of skill in the art will appreciate that a SAS port expander will only recognize those physically attached storage devices that are logically assigned SAS expander ports. Additional SAS storage devices may be present within a storage enclosure, but if all available SAS expander ports have been logically assigned to other storage devices, then the remaining storage devices will not be recognized by the SAS port expander.

The RAID controller then performs discovery operations in step 412 to discover all physically attached SAS storage devices within the selected storage enclosure. As the storage devices are discovered, they are inventoried in step 414 along with their physical description and operational parameters. Comparison operations are then performed between the storage enclosure inventory and the SAS expander port assignment configuration in step 416. A determination is then made in step 418 whether there are SAS storage devices present in the storage enclosure that do not have a logical assignment of a SAS expander port. If there are, then the identified SAS storage devices are designated in step 420 as being available for the assignment of SAS expander ports. Once designated, the SAS storage device inventory for the storage enclosure is updated in step 422, indicating the location within the storage enclosure of the excess SAS storage devices. Once the storage enclosure inventory is updated in step 422, or if it is determined in step 418 that there are no excess SAS storage devices within the storage enclosure, the device ports of all of the physically attached storage devices are re-bypassed in step 424.

A determination is then made in step 426 whether additional storage enclosures are to be inventoried for SAS storage devices. If it is decided in step 426 to inventory additional storage enclosures, then the process is repeated, beginning with the selection of another storage enclosure in step 404. Otherwise, SAS expander port assignment configurations are applied to the inventoried storage enclosures in step 428, with the result that SAS expander ports are logically assigned to the device ports of the SAS storage devices within each storage enclosure. Once the SAS expander port assignment configurations are applied, SAS storage operations are performed in step 430, including the monitoring of SAS storage devices for the occurrence of fault conditions.

If it is determined in step 432 that no SAS storage device fault has been detected, then a determination is made in step 454 whether SAS storage management operations are to be ended. If it is decided to not end SAS storage management operations, then SAS storage operations continue to be performed, beginning with step 430. Otherwise, SAS storage management operations are ended in step 456. However, if it is determined in step 432 that a SAS storage device fault has been detected, then the SAS device inventory for the affected storage enclosure is retrieved in step 434. Once retrieved, the SAS device inventory is processed to determine whether a spare SAS storage device is available within the storage enclosure for the logical assignment of SAS expander ports. If it is determined in step 436 that no SAS storage devices are available for the logical assignment of SAS expander ports, then an administrator is notified in step 452 that the SAS storage device has failed and needs replacement. A determination is then made in step 454 whether SAS storage management operations are to be ended. If it is decided to not end SAS storage management operations, then SAS storage operations continue to be performed, beginning with step 430. Otherwise, SAS storage management operations are ended in step 456.

However, if it is determined in step 436 that a spare SAS storage device is available within the storage enclosure, then the logical assignment of the SAS expander port is removed from the device port of the failed SAS storage device in step 438. The SAS expander port is then logically assigned to the device port of the spare drive in step 440. The expander port logical assignment is then validated in step 442, and the SAS expander port assignment configuration is updated. The SAS device inventory for the storage enclosure is then updated in step 444, indicating that the spare drive is no longer available for the logical assignment of a SAS expander port. The spare drive is then placed into an operational state in step 446 to perform SAS storage operations. A determination is made in step 448 whether the failed SAS storage device was a member of a RAID array. If it was, then RAID array rebuilding operations are performed in step 450 using the spare SAS storage device and its logical assignment of a SAS expander port. If it is determined in step 448 that the failed SAS storage device was not part of a RAID array, or once RAID array rebuilding operations are completed in step 450, then the performance of SAS storage operations are continued, beginning in step 430.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features. integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of skill in the art without departing from the scope and spirit of the invention. The embodiment was chosen and described in order to best explain the principles of the invention and the practical application, and to enable others of skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer-implementable method for managing serial attached small computer system interface (SAS) devices, comprising:
    selecting an SAS storage enclosure connected to an SAS expander, wherein:
        said SAS storage enclosure comprises a plurality of physically attached SAS storage devices having a device port; and
        said SAS expander comprises a plurality of SAS expander ports logically assigned to said device ports;
    bypassing said device ports to deassign said logical port assignments;
    generating an inventory of said plurality of physically attached SAS storage devices;
    identifying any of said inventoried plurality of physically attached SAS storage devices not having a said logical port assignment, wherein said identifying is performed by comparing said inventoried plurality of physically attached SAS storage devices to said SAS expander port assignment configuration;
    designating said any identified SAS storage devices as available for logical port assignment; and
    unbypassing said device ports to reassign said logical port assignments.

2. The method of claim 1, wherein said logical port assignments are contained in an SAS expander port assignment configuration.

3. The method of claim 1, wherein said inventorying is performed by a redundant array of independent disks (RAID) controller.

4. The method of claim 1, wherein said logical port assignment is deassigned from said device port of an SAS storage device operating in a fault state.

5. The method of claim 4, wherein said deassigned logical port assignment is reassigned to said SAS storage device designated as available for logical port assignment.

6. A system comprising:
    a processor;
    a data bus coupled to the processor; and
    a computer-usable medium embodying computer program code, the computer-usable medium being coupled to the data bus, the computer program code managing serial attached small computer system interface (SAS) devices and comprising instructions executable by the processor and configured for:
        selecting an SAS storage enclosure connected to an SAS expander, wherein:
            said SAS storage enclosure comprises a plurality of physically attached SAS storage devices having a device port; and
            said SAS expander comprises a plurality of SAS expander ports logically assigned to said device ports;
        bypassing said device ports to desassign said logical port assignments;
        generating an inventory of said plurality of physically attached SAS storage devices;
        identifying any of said inventoried plurality of physically attached SAS storage devices not having a said logical port assignment, wherein said identifying is performed by comparing said inventoried plurality of physically attached SAS storage devices to said SAS expander port assignment configuration;
        designating said any identified SAS storage devices as available for logical port assignment; and
        unbypassing said device ports to reassign said logical port assignments.

7. The system of claim 6, wherein said logical port assignments are contained in an SAS expander port assignment configuration.

8. The system of claim 6, wherein said inventorying is performed by a redundant array of independent disks (RAID) controller.

9. The system of claim 6, wherein said logical port assignment is deassigned from said device port of an SAS storage device operating in a fault state.

10. The system of claim 9, wherein said deassigned logical port assignment is reassigned to said SAS storage device designated as available for logical port assignment.

* * * * *